United States Patent [19]

Eugster et al.

[11] 4,329,144
[45] May 11, 1982

[54] DISPERSE DYE STABLE TO DYEING, AND ITS USE FOR DYEING AND PRINTING SYNTHETIC AND SEMI-SYNTHETIC FIBRE MATERIALS

[75] Inventors: Peter Eugster, Arlesheim; Stefan Koller, Ramlinsburg, both of Switzerland

[73] Assignee: Ciba-Geigy Corporation, Ardsley, N.Y.

[21] Appl. No.: 216,459

[22] Filed: Dec. 15, 1980

[30] Foreign Application Priority Data

Dec. 27, 1979 [CH] Switzerland ............... 11460/79
Jan. 9, 1980 [CH] Switzerland ............... 134/80

[51] Int. Cl.$^3$ ............... D06P 67/02
[52] U.S. Cl. ............... 8/526; 8/662; 260/207.5; 260/208
[58] Field of Search ............... 8/662, 526; 260/208, 260/207.5

[56] References Cited

U.S. PATENT DOCUMENTS 2,007,382 7/1935 Ockman et al. ............... 8/526
4,074,965 2/1978 Kruse et al. ............... 8/662
4,152,114 5/1979 Koller et al. ............... 8/662

FOREIGN PATENT DOCUMENTS 2536052 2/1977 Fed. Rep. of Germany.
1543316 4/1979 United Kingdom.

Primary Examiner—A. Lionel Clingman
Attorney, Agent, or Firm—Edward McC. Roberts

[57] ABSTRACT

By suspension of the melt of the known crystallographically amorphous dye of the formula

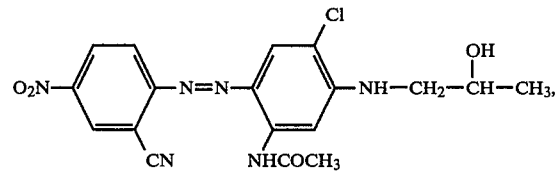

which is unstable to dyeing, in water at a temperature of 90° to 130° C., this dye can be caused to crystallize. There is obtained a crystalline granulate in which the dye is completely in the novel ε-modification.

The novel dye modification is stable in dispersion under dyeing conditions, and has no tendency to flocculate.

6 Claims, 1 Drawing Figure

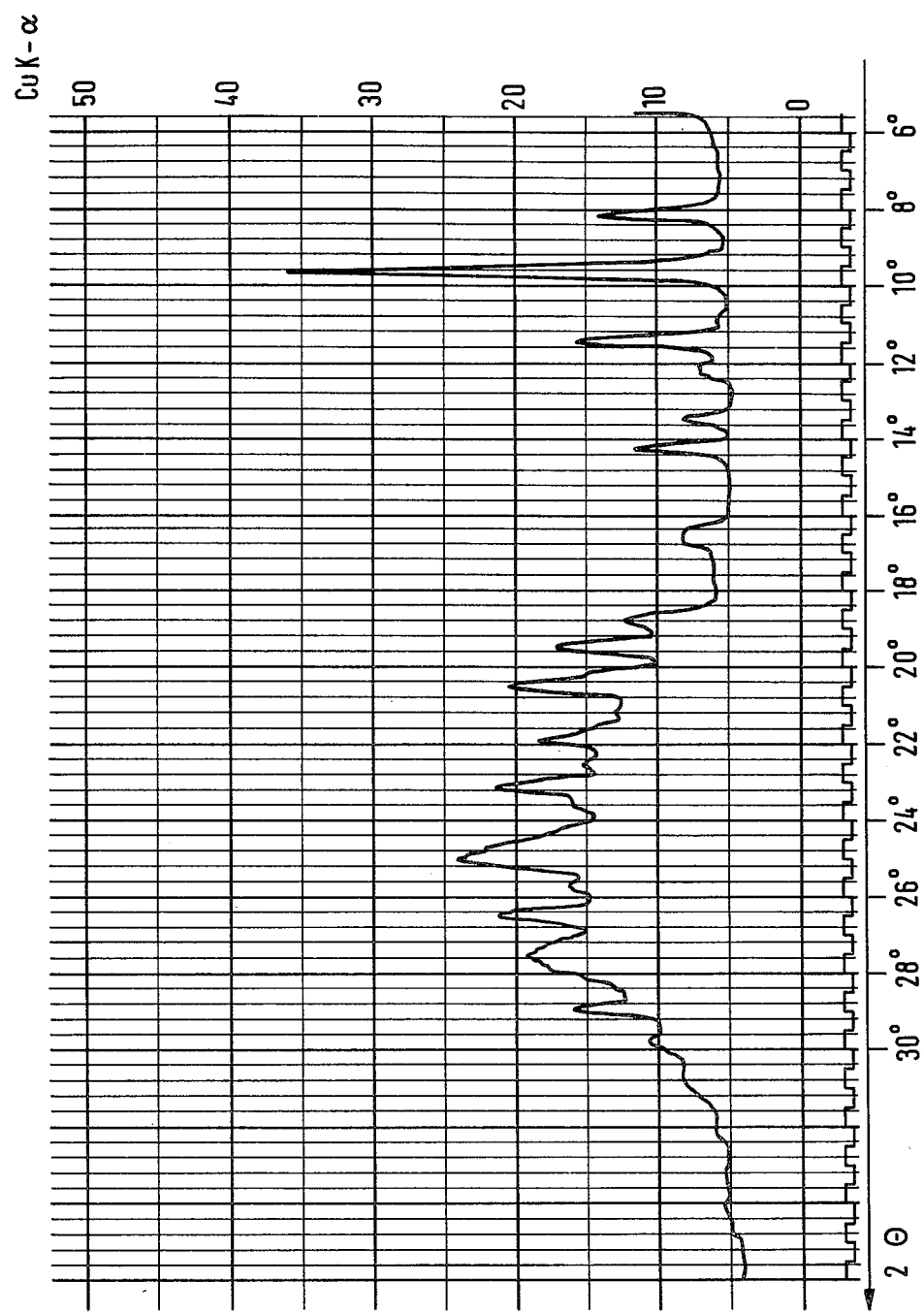

DISPERSE DYE STABLE TO DYEING, AND ITS USE FOR DYEING AND PRINTING SYNTHETIC AND SEMI-SYNTHETIC FIBRE MATERIALS

The present invention relates to a novel crystallographic modification of the azo dye of the formula

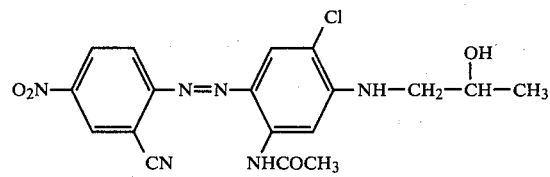

which is stable to dyeing and which is characterised by the X-ray diffraction pattern with the characteristic reflexes, taken with CuK-α1 radiation and shown in FIG. 1, and by the d values of the interplanar spacings, calculated from the diffraction pattern, whereby in the following only the lines of very strong (ss) and strong (s) relative intensity are taken into account:

d [Å]: 10.9 s, 9.1 ss, 7.7 s, 6.2 s, 4.58 s, 4.34 s, 3.86 s, 3.57 s, 3.37 s, 3.09 s.

The crystallographic amorphous modification of the dye of the aforementioned formula, with a softening range of below 90° C., and its use for dyeing and printing textile material, particularly polyester fibre material, are known. The dye can be produced, using the process known from the Swiss Patent specification No. 561,756, by the coupling of diazotised 2-cyano-4-nitro-aniline, and 1-[N-(β-hydroxypropyl)-amino]-2-chloro-5-acetylaminobenzene in an aqueous medium. By this process the dye is obtained in an amorphous form which is not sufficiently stable under the conditions occurring in the dye liquor.

The novel modification stable to dyeing of the present invention, designated in the following as the ε-modification, is obtained by rapidly heating an aqueous suspension of the amorphous dye, which optionally contains an anionic dispersing agent, to a temperature above 90° C. until the formation of a liquid dye melt is complete, finely dispersing this melt in the aqueous phase by either simultaneous or preferably subsequent vigorous stirring, and holding the formed suspension at this temperature until the melt has fully crystallised.

The transformation of the amorphous dye into the crystalline dye can be easily traced by taking X-ray diffraction spectra and determining the melting points.

In producing the novel ε-modification stable to dyeing it is advantageous to start directly with the aqueous coupling suspension of the axo dye, as is obtained in the production of the dye after coupling. This suspension is firstly heated rapidly, optionally under pressure, to a temperature of 90° to 130° C., preferably 93° to 100° C., during which the amorphous dye converts into a liquid melt floating on the aqueous phase; and, advantageously afterwards, the melted dye is broken up by vigorous stirring into small droplets and thus dispersed in the aqueous phase. The suspension is then thoroughly stirred at 90° to 130° C., preferably 93° to 100° C., until the dye droplets are completely crystallised throughout: the time required for this in practice is 0.5 to 10 hours, preferably 2 to 5 hours. Crystallisation can optionally be initiated by the addition of seed crystals of the ε-modification. After being produced, the ε-modification stable to dyeing is separated from the aqueous phase, for example by filtration, and subjected to a known finishing operation.

To obtain dye preparations which are technically suitable for dyeing and printing, the ε-modification according to the invention can be converted into a finely divided form by the usual mechanical processes, optionally in the presence of water and of suitable dispersing agents and other customary additives. The normal type of devices, such as mills, for example ball mills, vibratory mills, sand mills or kneaders, can be used for the fine division of the ε-modification optionally to be performed. Suitable dispersing agents are for example condensation products of mono- or polynuclear aromatic compounds, such as naphthalene, naphthols, phenols or sulfonic acids thereof, with formaldehyde or with other substances which can condense with aromatic rings, such as urea, ethylene oxide or isocyanates, optionally with the addition of sodium sulfite, also lignin sulfonates and nonionic or anionic, surface-active compounds.

Under dying conditions, such as high temperature, and in the presence of dyeing auxiliaries, the novel ε-modification stable to dyeing undergoes no further change with regard to crystal size and crystal form, so that the dyeing properties and the stability of the dispersion, in contrast to those properties in the case of the amorphous modification which is unstable to dyeing, are not impaired during the dyeing process.

The novel dye modification processed into a finely divided form is excellently suitable for dyeing synthetic and semi-synthetic textile materials, such as synthetic linear polyesters, for example polyethylene glycol terephthalate, or chemically analogously synthesised polymers, and semi-synthetic fibre materials, such as celluloe triacetate, at temperatures of about 100° to 220° C. Under dyeing conditions, the novel dye modification is stable in dispersion and does not have the disadvantages of the conventionally obtainable unstable amorphous modification of the stated dye of giving rise, in dyeing processes in which the dye is exposed for a prolonged period in the aqueous medium to an elevated temperature, to dye flocculation and filtration effects, which frequently lead to unlevel dyeings with poor fastness to rubbing. In the case in particular of the dyeing of wound packages—for example cheeses—there is no occurrence of agglomerations, flocculation and finally filtration of the dye on the spools even when the dye liquor is only slowly exhausted or when dyeing is performed with such an excess of dye that an exhaustion of the dye bath never occurs. The novel dye modification is therefore excellently suitable particularly in machine dyeing for loose material and for the dyeing of spools or yarns.

Except where otherwise stated in the following Examples, the term 'parts' denotes parts by weight.

The X-ray diffraction pattern was taken with CuK-α1 radiation (λ=1.5405 Å). The calibration substance used was α-quartz, the d values of which are calculated from a=4.913 Å and c=5.405 Å. The relative line intensities were estimated visually.

EXAMPLE 1

The coupling suspension of the amorphous azo dye, obtained by coupling 74 parts of diazotised 2-cyano-4-nitroaniline with 95 parts of 1-[N-(β-hydroxypropyl)-amino]-2-chloro-5-acetylaminobenzene, is rapidly heated to 95° C. by direct heating, for example by the introduction of saturated steam, in the course of which the dye converts into a thinly liquid melt and creams up on the surface of the aqueous phase. By means of subsequent vigorous stirring at 95° C., the liquid organic dye phase is beaten up into small droplets and finely dispersed in the aqueous phase. After three hours' stirring at 93°–98° C., the fine dye droplets have fully crystallised in the form of a crystalline dye granulate (diam. about 0.2–15 mm, mainly about 0.5–2 mm) in the desired ε-modification. The granulate, which can be easily filtered off, is filtered off with suction, washed on the suction filter with water at 50° C. and dried by suction. The moist filter cake is finally dried at 70°–80° C. in vacuo.

The dye which was originally in the amorphous modification has now been completely converted into the novel ε-modification, m.p. 168°–176° C. (uncorr.).

EXAMPLE 2

10 parts of the ε-modification of the dye stable to dyeing, produced according to Example 1, together with 5 parts of a condensation product of a naphthalenesulfonic acid with formaldehyde in 60 parts of water, are ground by means of a glass-bead mill until an adequate fine division is obtained. There are subsequently added 15 parts of an oxylignin sulfonate, and the mixture is dried in a spray-drying apparatus.

In a pressure-dyeing apparatus, 40 g of the resulting dye dispersion are suspended in 40 liters of water at 70° C. containing 4 g of oleyl polyglycol ether. The pH value of the dye bath is adjusted with acetic acid to 4 to 5. A wound package consisting of 2000 g of polyethylene glycol terephthalate yarn is then dyed therewith by raising the temperature of the dye bath within 30 minutes from 70° to 130° C. and holding the bath at this temperature for 50 minutes. There is obtained after the customary finishing of the dyeing a wound package which is evenly dyed bluish-red and which displays no staining or deposits of dye.

When 10 parts of the amorphous modification of the dye obtained according to Example 1, which is unstable to dyeing, are used, the procedure otherwise being as described in the above Example, a bluish-red dyeing is obtained which however is uneven, unusable and not fast to rubbing, and which moreover has deposits of dye on the surface of the dyed material.

What is claimed is:

1. A modification of the dye of the formula

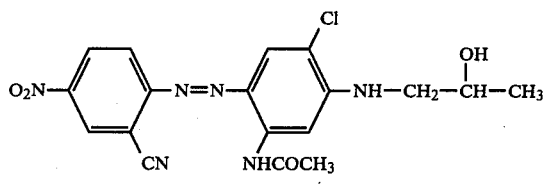

which modification is stable to dyeing and which is characterised by the X-ray diffraction pattern (CuK-α radiation) with the characteristic reflexes shown in FIG. 1, and by the d values of the interplanar spacings, calculated from the diffraction pattern:

d [Å]: 10.9 s, 9.1 ss, 7.7 s, 6.2 s, 4.58 s, 4.34 s, 3.86 s, 3.57 s, 3.37 s, 3.09 s.

2. A process for producing the ε-modification stable to dyeing according to claim 1, which process comprises rapidly heating the crystallographically amorphous dye of the given formula, in an aqueous suspension, to a temperature above 90° C. until a liquid dye melt is formed, and holding the suspension at this temperature until the melt is fully crystallised throughout.

3. A process according to claim 2, wherein the liquid dye melt is finely dispersed in the aqueous phase by vigorous stirring, and the suspension is held for 0.5 to 10 hours, at a temperature of 90° to 130° C.

4. A process according to claims 2 or 3, wherein as starting material there is used directly the aqueous coupling suspension occurring in the production of the amorphous azo dye.

5. The process of claim 3, wherein the suspension is held for 2 to 5 hours.

6. The process of claim 3, wherein the temperature is 93° to 100° C.

* * * * *